United States Patent [19]

Butwell et al.

[11] 4,355,355
[45] Oct. 19, 1982

[54] ADDRESS GENERATING MECHANISM FOR MULTIPLE VIRTUAL SPACES

[75] Inventors: Justin R. Butwell, Milton; Casper A. Scalzi, Poughkeepsie; Richard J. Schmalz, Wappingers Falls, all of N.Y.

[73] Assignee: International Business Machines Corp., Armonk, N.Y.

[21] Appl. No.: 131,570

[22] Filed: Mar. 19, 1980

[51] Int. Cl.³ .............................................. G06F 9/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,778,776 | 12/1973 | Hakozaki | 364/200 |
| 3,938,096 | 2/1976 | Brown et al. | 364/200 |
| 3,949,378 | 4/1976 | Crabb et al. | 364/200 |
| 4,004,278 | 1/1977 | Nagashima | 364/200 |
| 4,035,779 | 7/1977 | Birney et al. | 364/200 |
| 4,037,207 | 7/1977 | Birney et al. | 364/200 |
| 4,037,214 | 7/1977 | Birney et al. | 364/200 |
| 4,037,215 | 7/1977 | Birney et al. | 364/200 |
| 4,038,645 | 7/1977 | Birney et al. | 364/200 |
| 4,042,913 | 8/1977 | Birney et al. | 364/200 |
| 4,050,060 | 9/1977 | Birney et al. | 364/200 |
| 4,084,227 | 4/1978 | Bennett et al. | 364/200 |
| 4,096,573 | 6/1978 | Heller et al. | 364/200 |
| 4,128,875 | 12/1978 | Thurber et al. | 364/200 |
| 4,136,385 | 1/1979 | Gannon et al. | 364/200 |
| 4,145,738 | 3/1979 | Inoue et al. | 364/200 |

Primary Examiner—Gareth D. Shaw
Assistant Examiner—Eddie P. Chan
Attorney, Agent, or Firm—Bernard M. Goldman

[57] ABSTRACT

The detailed embodiment associates access registers (AR's) with the general purpose registers (GPR's) in a data processor. The AR's are each loaded with a unique STD (segment table descriptor). The STD comprises a segment table address in main storage and a segment table length field. There are 15 AR's associated respectively with 15 GPR's in a processor to define a subset of up to 15 data address spaces. The STD in an AR is selected for address translation when the associated GPR is selected as a storage operand base register, such as being the GPR selected by the B-field in an IBM System/370 instruction. The invention allows each AR to specify that it does not use the STD in its associated AR to define its data address space, but instead uses the STD in the program address space AR. However, the STD content of an AR is not selected for an address translation if the associated GPR is selected for a purpose other than as a storage operand base register, such as if a GPR is selected as an index (X) register or as a data source or sink register (R) for an instruction. A sixteenth AR may be provided to define and control the executing program address space, which may also contain data.

The embodiment obtains authority and other control for access to and use of the content in each address space by also associating an AR Control Vector (ARCV) register with each AR.

28 Claims, 5 Drawing Figures

(STD SELECTION MECHANISM)

ADDRESS GENERATING MECHANISM FOR MULTIPLE VIRTUAL SPACES

FIELD OF THE INVENTION

The invention relates to a method and means for enabling a program being executed in a data processing system to have concurrent access to multiple virtual address spaces.

DESCRIPTION OF THE PRIOR ART

Data processing systems using virtual addressing in multiple virtual address spaces are well known, such as the IBM System/370 systems using MVS system control programming. Such systems define each address space as having linear addressability from 0 to $(2^{24}-1)$ bytes using a segment table, in which each entry contains an address of a page table, and each page table defines a plurality of page entries in the address space. Each page entry may contain the address of any assigned page frame in main storage. Each address space is referred to by a pointer called a segment table origin (STO) which locates the address space segment table in main storage. In current System/370 architecture, each address space has up to 16 megabytes ($2^{24}$) of linear virtual addressability beginning at address zero. In current System/370 MVS Operation, an unlimited number of address spaces are available; different address spaces are assigned to different users of the system, and the address spaces obtain isolation between the users of the system, i.e. one user can only address within his own address space and is isolated from the address spaces of the other users. The exception is when an address space, or a part thereof, is defined in common among all users, which is the subject of U.S.A. Pat. No. 4,096,573 entitled "DLAT Synonym Control Means For Common Portions Of All Address Spaces" to A. R. Heller et al, and U.S. Pat. No. 4,136,385 entitled "Synonym Control Means For Multiple Virtual Storage Systems" to P. M. Gannon et al, both assigned to the same assignee as the subject application. The result is either total isolation between address spaces with no inter-space access permitted or total accessibility of an address space, or a part thereof, by all users.

The IBM Series/1 Data Processing System supports concurrent accessing in plural address spaces in a different manner from the subject invention. The Series/1 processor relates the source operand in an instruction to one address space, relates any sink operand in the instruction to a second address space, and relates the fetching of instructions to a third address space. On the other hand, the subject invention does not use the source or sink characteristic of an instruction operand to relate it to an address space (AS). Instead, the subject invention uses an operand designation of a general purpose register (GPR) as a base address register to select an address space associated with the GPR. As a result, the subject invention can easily switch address spaces for any operand without the intervention of any address space switching instruction, e.g. source operands in succeeding instructions may be in different address spaces. The following patents owned by the assignee of the subject application relate to the address space control used in the IBM Series/1 architecture:

U.S.A. Pat. No. 4,035,779 entitled "Supervisor Address Key Control System" by R. E. Birney et al, discloses a level status register (LSR) that has an (alternate protect mode) APM bit, and a supervisor state bit; they control a limited supervisor addressability without disturbing a user address key contained in the user key register (UKR). When both bits are set, each instruction fetch must be in the (0 key) supervisor key area, while each operand access is in the user key area identified by the current key in the UKR. The supervisor can never access any other key area in the main memory. When only the supervisor bit is on, all instruction and operand accesses are in the supervisor key area only. If both bits are off, only user accesses are allowed.

U.S.A. Pat. No. 4,037,207 entitled "System For Controlling Address Keys Under Interrupt Conditions" by R. E. Birney et al, discloses each processor AAK (ignoring each I/O AAK) being inputted as the processor last key saved (i.e. LKSA) in a processor last AAK register. On the occurrence of a machine check or program check interrupt, the last AAK register has its input blocked (so that it can retain the LKSA). Then the LKSA is outgated to the source operand key section (OP1K) of the AKR and OP2K and ISK are set to the supervisor key (so that the supervisor program can be initiated by the interrupt with LKSA addressability which probably contains the cause of the interrupt.

U.S.A. Pat. No. 4,037,214 entitled "Key Register Controlled Accessing System" by R. E. Birney et al, discloses active address key (AAK) select circuits to correlate key register sections respectively containing address space identifiers in a processor AKR, and in I/O subchannels, with machine-identifiable types of storage accesses available in the main memory. Different machine-identifiable access types include, for example, the instruction fetch, source operand fetch, sink operand fetch/store, and I/O subchannel access.

U.S.A. Pat. No. 4,037,215 entitled "Key Controlled Address Relocation Translation System" by R. E. Birney et al, discloses an address relocation translation system combined with a plurality of AKR sections, and AAK select circuits to translate machine-selected address keys and program selected logical addresses in order to manage the space in a physical main memory.

U.S.A. Pat. No. 4,038,645 entitled "Non-Translatable Storage Protection Control System" by R. E. Birney et al, discloses the AKR sections combined with the AAK select circuits with a conventional type of storage protect key memory control to obtain address sub-range protectability among different machine-identified storage-access-types being accessed in a main memory. Also, address sub-range(s) associated with a common key are made shareable by users of the system; and all I/O accesses override a sub-range read-only protect flag.

U.S.A. Pat. No. 4,042,913 entitled "Address Key Register Load/Store Instruction System" by R. E. Birney et al, discloses instruction operated controls for the loading and storing of address keys (i.e. address space identifiers) into or from an address key register (AKR) to control addressabilities within a system.

U.S.A. Pat. No. 4,050,060 entitled "Equated Operand Address Space Control System" by R. E. Birney et al, discloses equate operand spaces (EOS) control circuits, which when enabled, force all operand accesses (i.e. source and sink) to occur within the sink operand addressability provided by the OP2K section in the AKR, even though the AKR provides a different addressability with its OP1K section for source operand accesses. When the EOS feature is disabled, the source operand addressability provided by OP1K section is used when fetching source operands.

SUMMARY OF THE INVENTION

The subject invention is concerned with obtaining precise control over the degree of isolation or shareability among subsets of address spaces in a system in relation to an executable program. The shareability control is obtained in a processor by means of a unique architectural method and its means of implementations, which is compatible with current IBM System/370 architecture.

Objects of this invention are to provide processor means:

1. Which can directly address named collections of data in different address spaces with relative byte addressing.
2. With direct addressability to data sets which may be handled as named collections by both processor storage and I/O storage.
3. With concurrent access to a subset of plural address spaces.
4. Which is compatible with existing data processing system architecture to permit the execution of both programs designed for existing architecture and for the new architecture of the subject invention.
5. For simultaneously having executable access to a subset of address spaces which are easy to use in a direct manner by user application programs as well as by existing access method programs.
6. Which at any one time has concurrent access to an executing program's address space and a subset of data address spaces, e.g. up to 15 data spaces.
7. With a separate access register associated with each base register that defines relative byte addressing in a concurrently accessible address space.
8. To support a maximum number of currently accessible data spaces dependent upon the number of general purpose registers used by the processor architecture.
9. To support relative byte addressing in each address space having up to $2^N$ linear byte addresses, in which N is the number of bits in a general purpose register.
10. That can at any time change the subset of concurrently accessible address spaces by reloading the access registers for accessing different address spaces.
11. In which program address spaces may share specified data address spaces but may not share other data address spaces, and may be allowed or prohibited from sharing access to each other's program address space.
12. Having authority controls on each access register to permit different programs to have different authorities to access the same data address space.
13. Having descriptor fields with each access register defining attributes of the associated address space, or the data elements within the space, which determine the operations of instructions relative to that space.
14. With an addressing mechanism which need not connect a data address space to a program until access is required by the program.
15. With an addressing mechanism which can support data address spaces independent of any program when the program is made not executable in the processor, e.g. when the program is not dispatched.
16. Which allows an access register to be disabled to permit its general purpose register to provide relative addressing of data in the program address space, but also allows the access register to be enabled so that its general purpose register controls relative addressing in a data address space specified by its access register separately from the program address space.
17. Which allows access registers to be disabled while the processor is executing programs under current architecture to eliminate the need for loading the access registers prior to execution of such programs.
18. Having authority controls with each program space separately authorizing programs in that program space to use specified privileged instructions.
19. Which can have sequential operand requests flexibly access different address spaces identified in a plurality of access registers. No intervention is needed by any address space switching instruction, and without any required relationship between any address space and the source or sink state of the requesting operand in an instruction.

It is therefore a feature of this invention to control access to data in a subset of address spaces by an executing program without requiring any interruption in the execution of the program when it changes its accessing of data to a different address space in the subset. The manner of access can be varied among the different address spaces; for example, the program may be permitted to read (but not write) data from one address space, write (but not read) data in a second address space, and both read and write data in a third address space.

The invention associates access registers (AR's) with the general purpose registers (GPR's) in a data processor. The AR's may each be loaded with an address space identifier, for example, a unique STD (segment table descriptor). The STD comprises a STO field and a segment table length field. Thus, there may be 16 AR's associated respectively with 16 GPR's in a processor. The address space identifier in an AR is selected for address translation when the associated GPR is selected as a storage operand base register, such as being the GPR selected by the B-field in an IBM System/370 instruction. However, the address space identifier content of an Ar is not selected for an address translation if the associated GPR is selected for a purpose other than as a storage operand base register, such as if a GPR is selected as an index (X) register or as a data source or sink register (R) for an instruction.

The invention also obtains authority control for each program's access to each address space by also associating an AR Control Vector (ARCV) register with each AR to control the type of access permitted to the associated address space by an executing program.

A special field in either an AR or its associated ARCV may indicate whether the AR content is enabled and thereby contains a useable address space identifier; or is disabled and the address space identifier must be obtained elsewhere. This special field with each AR permits the GPR of any disabled AR to specify a base value associated with the address space defined by another AR; for example, a disabled GPR may specify a base address for data in the program address space defined by AR0.

Thus, the invention controls which address space may contain an executing program and which other address spaces may be accessed for data by the executing program. This may be done by permanently assigning one of the AR's to contain the STD of the executing program (e.g. AR0). Then the other AR's may be permanently available to contain the address space identifiers of other address spaces which have data accessible to the executing program. Their associated ARCV registers then control the type of access permitted into such data address spaces by the executing program. The executing program address space may also contain data available to the program. For example in a System/370 machine, AR0 may be assigned for containing the STD of the executing program of a processor, while part or all of AR1 through AR15 available for containing the STD's defining address spaces containing data available to the program.

Furthermore, the above described arrangement is useable for executing current programs designed to run on IBM System/360 or System/370 architecture by disabling the use of AR's and ARCV's by the processor, since the GPR's may be the same as found in IBM System/370 processors. For example, a field in a control register or the program status word (PSW) can be assigned to indicate whether the processor is running in conventional System/360 or System/370 mode or whether the processor is running in the cross-virtual-memory mode of this invention.

A new non-privileged instruction (load AR/ARCV) is also provided by this invention to load the AR's and ARCV registers from fields in main storage and set the special field to the enabled state. The area in main storage containing the AR and ARCV values to be loaded for a particular program may be defined in an address and extent in one of the processor control registers, which may be called a DSI CR. The AR and ARCV values to be loaded for a given program are contained in the data space inventory (DSI) defined by the DSI CR. The load AR/ARCV instruction uses the DSI CR address to load into a specified AR, a DSI entry for an address space to be accessed by the program. The loading of the DSI CR is done by the privileged System/370 Load control (LCTL) instruction. Therefore, a program using the load AR/ARCV instruction may not have authority for issuing the privileged LCTL instruction. Thus, the only access to the DSI addressed by the DSI CR is by means of the load AR/ARCV instruction. A non-privileged store AR/ARCV instruction can only store the current AR values into the DSI currently defined in the DSI CR. The extent field specified in the DSI CR prevents the accessing by either the load AR/ARCV or store AR/ARCV instructions outside the specified DSI. The origin and extent for the DSI may be in two separate CR's called a DSI CR pair. Another non-privileged instruction may be provided to set the disabled state in the special field for any AR to disable the AR.

BRIEF DESCRIPTION OF THE PREFERRED EMBODIMENTS

Figure 1:
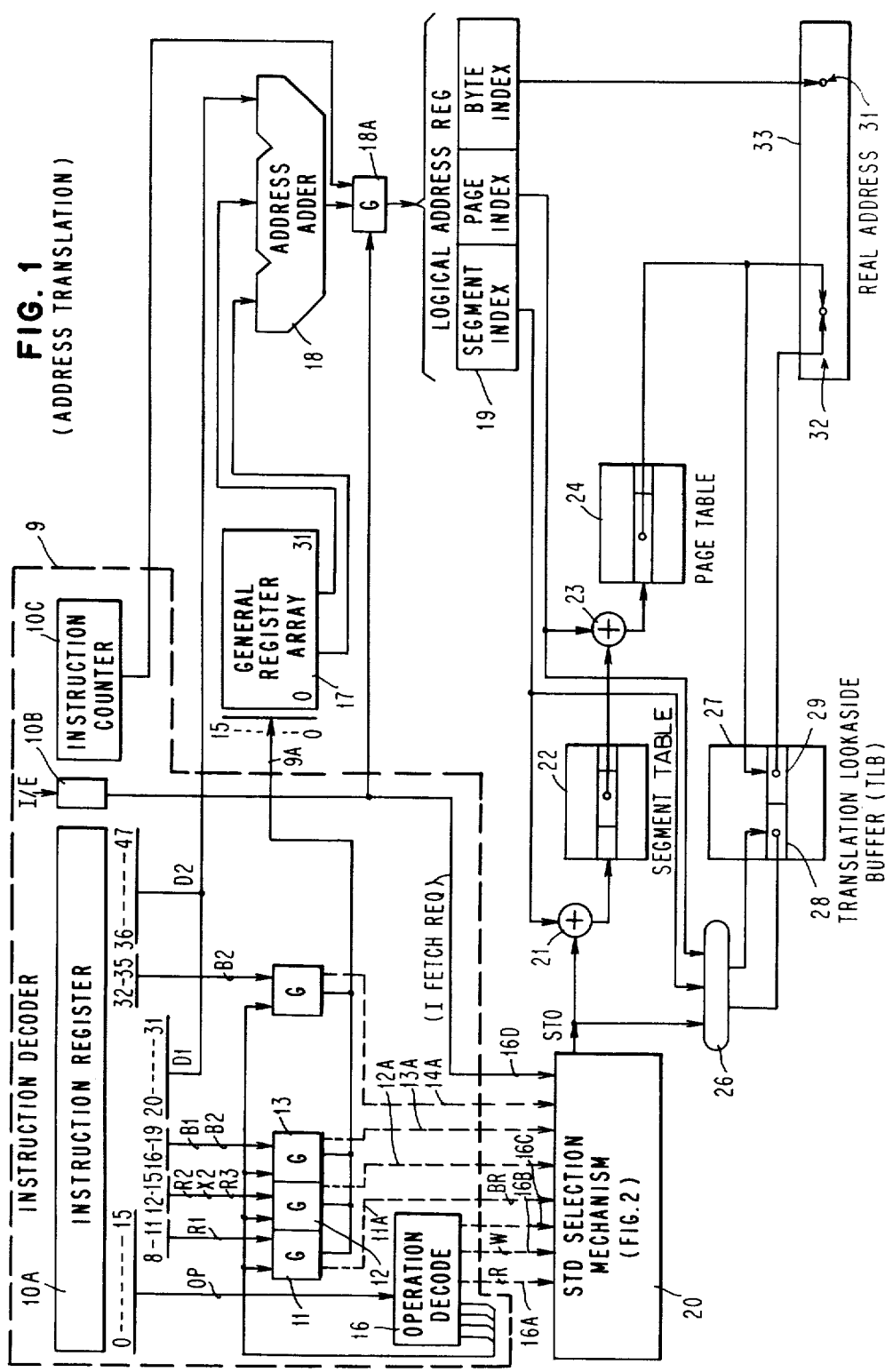
FIG. 1 shows the invention comprising an address space identifier selection mechanism in combination with an instruction decoder inserted into an otherwise conventional address translation environment in a data processing system.

FIG. 1 shows symbolically a conventional instruction decoder 9, such as may be found in any of a number of commercial processors such as an IBM 3033 processor. Decoder 9 can decode any of the IBM System/370 instructions which have an operation code indicating the instruction length and type. The operation code defines which fields of the instruction are R, X or B fields that specify GPR's. These GPR fields are selected by gates 11, 12, 13 and 14 which have outputs provided on a four bit address bus 9A to a general register array 17 which contains sixteen GPR's. The signal on bus 9A selects a required GPR in array 17.

Gates 11, 12, 13 and 14 detect the base register addresses on busses 11A, 12A, 13A and 14A to a STD selection mechanism 20, which selects an AR/ARCV pair associated with the GPR simultaneously selected in array 17.

The X, B, D components of each logical address are sent by array 17 and instruction decoder 9 to a conventional address adder 18 to generate the logical address in a register 19, which provides inputs to a conventional address translation mechanism with a conventional translation lookaside buffer (TLB) 27 of the type implemented within the IBM System/370 M3033 processor. Mechanism 20 outputs a STO from the selected AR and sends the STO to the conventional TLB and address translation mechanism. The TLB uses the STO with the segment index and page index from logical address register 19 to determine if the translation was previously done and is still valid in TLB 27. If that is the case, TLB addressing means 26 causes the translated real address to be immediately taken from TLB 27 and put in real address register 33, and the translation process is terminated. If the translation is not available in TLB 27, the full address translation process is executed accessing the segment table 22 addressed by the STO provided by mechanism 20 and the page table 24 accessed through that segment table using the segment and page indexes from logical address register 19.

Figure 2:
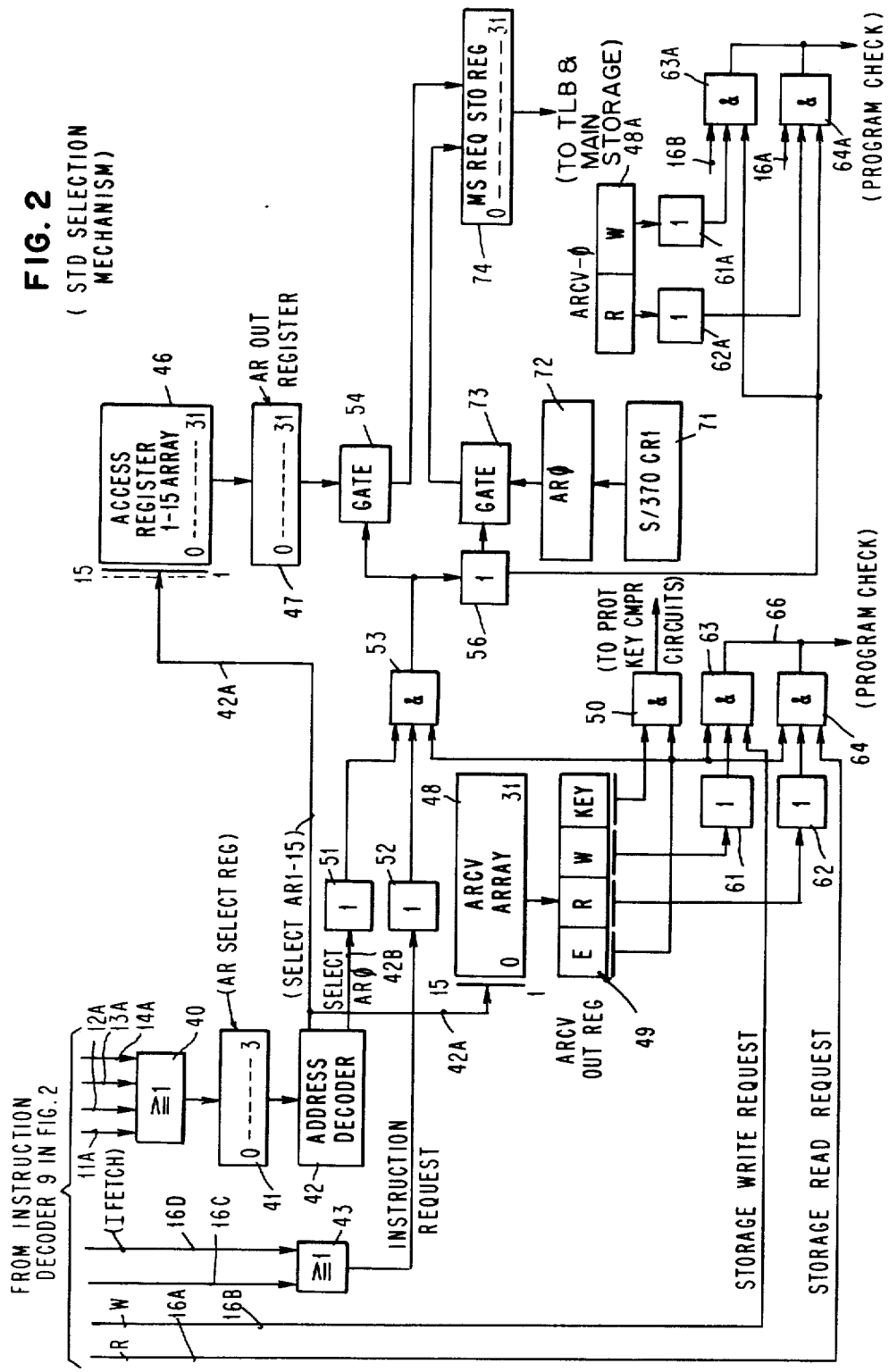
FIG. 2 is a preferred embodiment of the STD selection mechanism.

The basic STD selection mechanism 20 is shown in FIG. 2. It has an OR circuit 40 which receives the storage operand base register address provided on one of the lines 11A, 12A, 13A or 14A from the instruction decoder 9. The output of circuit 40 sets an AR select register 41 which is decoded by a sixteen way decoder 42 to activate one of sixteen output lines, of which address 0 activates the select AR0 line to inverter 51, while each of the other fifteen output lines, select AR 1-15, simultaneously selects a corresponding access register in the AR array 46 and a corresponding ARCV register in ARCV array 48.

The content of the selected AR in array 46 is set into an AR out register 47, while the content of the corresponding ARCV register in array 48 is set into an ARCV out register 49.

The content of register 47 is the STD in the selected AR in array 46.

AR0 register 72 contains the STD which specifies the address space containing the program which can access the data space specified by the selected STD in register 47. The program's STD may be directly loaded into register 72 from main storage, or the program STD may be transferred from a predetermined control register 71 which may be CR1 in the IBM System/370 architecture environment which requires that the STO in CR1 define the address space for the executing program and its accessible data.

The ARCV content in register 49 includes at least three bits: enable (E), read (R) and write (W), which determine the access rights of the executing program to the data space defined by the selected STD in register 47. The E bit must be set to 1 to enable the use of the corresponding AR register. Also a four bit storage key protect field (KEY) may be included in the ARCV to compare with the main storage protect key for an accessed 2K block wherein an equal comparison is required to allow the main storage access.

However, any address space may be accessed in main storage only when its STD is transferred to a main storage STO register 74. Therefore, the program space specified in AR0 register 72, or the data space specified in AR out register 47 may be accessed in main storage only when its STD is transferred into MS STO register 74. This access-request STD transfer is controlled by gates 54 and 73, which are oppositely enabled by the output of an AND gate 53. Gate 73 is enabled when gate 53 is disabled due to inverter 56 connected to the output of gate 53.

An instruction fetch request requires an access to the program address space. The request is outputted from an OR circuit 43 which receives a branch (BR) instruction access request on line 16C, or a next sequential instruction request on the I fetch line 16D. The instruction request signal from circuit 43 is inverted in inverter 52 to disable gate 53. When gate 53 is disable, the AR0 STD content is transferred by gate 73 into MS STO register 74 to control the instruction fetch request address.

However, during any operand access request, gate 53 will be enabled as long as the E bit is on in the corresponding ARCV. The STD in AR out register 47 is thereby transferred into MS request STO register 74, which contains the STO of the current request. Whenever the selected AR content is disabled, i.e. the E bit is off in the selected ARCV in register 49, gate 73 will be enabled and the program STD in AR0 will be tranferred to request STO register 74.

The authority for an operand access request is regulated by the value of the R and W bits in the selected ARCV in register 49. If the R bit is 1, fetch accesses are permitted, but they are not permitted if R is zero. Likewise, if W is 1, store accesses are permitted, but stores are not permitted if W is 0. If both W and R are set to one, then both read and write accesses are permitted in the data space. The AND gates 63 and 64 enforce the use of the W and R bits by outputting a program interrupt signal on line 66 if a storage request violates the bit setting. Thus, gate 63 outputs an interrupt signal if the W bit is off during a write request on line 16B from the instruction unit, and gate 64 outputs an interrupt signal if the R bit is off during a read request on line 16A from the instruction unit.

When AR0 is used as the STD for a storage access, ARCV0 register 48A has R and W bits which are rotated to inverter circuits 62A and 61A. The output of inverter 61A is routed to gate 63A which receives other inputs from line 16B and inverter 56. This checks authorization of the program to do a store in the program space and results in a program check if store accesses are not authorized. Similarly, gate 64A with inputs from inverters 62A and 56 and from line 16A checks authorization for an operand fetch access.

A storage protect key (KEY) field in each ARCV provides additional authority control over accesses to the data in the related address space. An AND gate 50 receives the KEY and the E bit from ARCV out register 49. If the E bit is enabled (i.e. set to 1), the key is transferred from the ARCV to the conventional key compare circuits in main storage, where the ARCV key must compare equal to the key for the 2KB storage block to permit the access, and the conventional PSW key is not used. If the E bit is disabled (i.e. set to 0), the ARCV key is not used, but the conventional PSW key is used instead.

Figure 3:
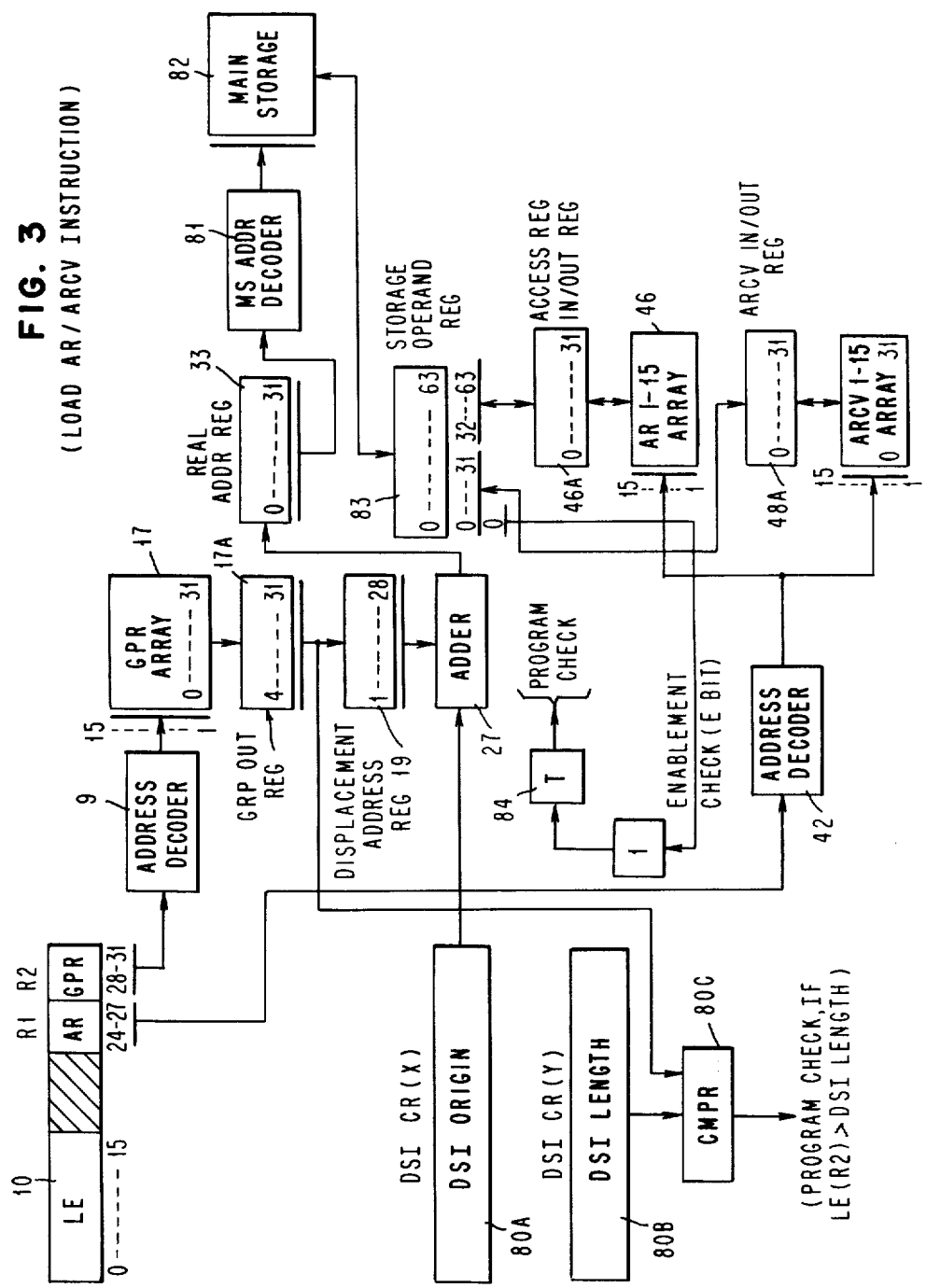
FIG. 3 is an embodiment of circuitry supporting the load AR/ARCV instruction.

FIG. 3 represents the circuits needed to support the execution of a load AR/ARCV instruction which is shown with an operation code LE in instruction register 10. The R1 field in bits 24–27 of the LE instruction contains the address of the AR and ARCV register pair to be loaded. The R2 field in bits 28–31 of register 10 contains the address of a GPR which contains the logical address of a double word in a data space inventory (DSI) in main storage which is to be loaded into the specified AR/ARCV pair. This logical address is in the DSI whose real storage origin is specified by the content of a control register (CRX) 80A. The R2 specified address in the LE instruction is a logical address transferred from the GPR array 17 into the GPR out register 17A offset to the left by three bit positions and to the displacement address register 19, from which it is transferred to adder means 27 where it is combined with the contents of DSI CR 80A into a real address put into register 33 which is used to access the DSI double word in main storage 82, which is outputted to storage operand register 83. DSI CR 80B contains the maximum DSI number that can be used by the executing program space. It is compared by comparator 80C with the content of register 17A, and if the register 17A content exceeds the content of DSI CR 80B, a program check is generated. The doubleword in register 83 contains field 0–31 which is loaded into the selected ARCV register in array 48 and field 32–63 which is loaded into the selected AR in array 46. Bit 0 in the ARCV field contains the E bit, which must be set to 1 to enable the selected AR/ARCV pair. If off, the E bit sets a trigger 84 which outputs a program interrupt to tell the operating system that the AR being loaded is not enabled.

A store AR/ARCV instruction is also provided. It is also represented by FIG. 3 except that the operation code is SE (instead of LE) in instruction register 10. Then the content of the AR/ARCV pair specified by the R1 field of the SE instruction is stored into the main storage doubleword specified by the R2 field of the SE instruction relative to a real main storage address in control register 80.

A disable AR instruction is also provided having a DAR operation code with a single R1 operand which specifies the ARCV in which the E bit is set to zero (i.e. to off state) to disable the associated AR.

Figure 4:
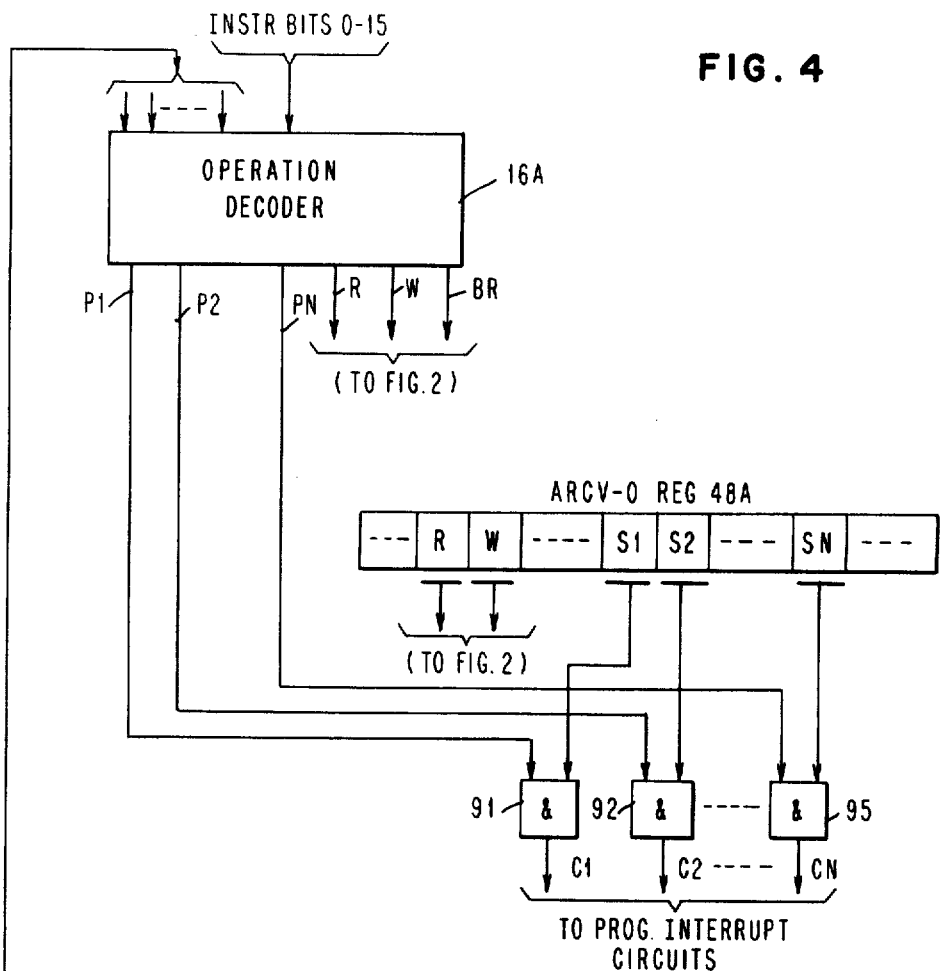
FIG. 4 is an addition to the embodiment in FIG. 2.

FIG. 4 illustrates an addition to the circuits in FIG. 2 to obtain additional functions for the STD selection mechanism by providing an ARCV-0 and further controls with ARCV 1-15. The ARCV-0 register settings control the execution of selected subclasses of privileged instructions in the program address space defined in AR-0.

The further controls with ARCV 1-15 provide an additional subset of operation decoding within a generic operation code of the current instruction being decoded by the instruction decoder 9 in FIG. 1.

The ARCV-0 privileged instruction subclass controls are independent of the additional ARCV 1-15 controls, and either may be used without the other, or neither may be used as is the case in FIG. 2.

Operation decoder 16A includes additional outputs P1, P2 . . . Pn which respectively signal different types of privileged instruction subclasses, as follows:

1. I/O instructions, e.g. start I/O, etc.
2. Multiprocessor instructions, e.g. SIGP, etc.
3. Special instructions, e.g. RPQ instructions, etc.
4. Maintenance instructions, e.g. diagnose, etc.
5. Load Control instruction.
6. Resource Management instructions, e.g. IPTE, set key, purge TLB, set clock, set interrupt masks, set CPU timer, etc.

An ARCV-0 register 48A contains the previously described authority control bits R and W and also contains a privileged instruction subclass mask bit positions S1, S2 . . . Sn which correspond to the decoder 16A output signal lines P1, P2 . . . Pn. The 0 or 1 setting of each subclass mask bit respectively enables or disables the execution of its corresponding subclass of privileged instructions accessed in the proper address space defined by the STD in AR0. The subclass enablement/disablement is done by AND gates 91, 92 through 95, each receiving a corresponding mask bit from the ARCV-0 register 48A and a corresponding signal line from operation decoder 16A. The outputs C1, C2 . . . Cn of gates 91 through 95 provide program check signals to the program interrupt circuits in the processor. Thus, if the S bit is set to 1 to disable a subclass, and operation decoder 16A issues a privileged instruction in the disabled subclass, the corresponding AND gate C will output a signal which causes a program interrupt, from which the system control program interrupt handler routine will stop further execution of the program in the current AR0 address space and indicate the reason for the stoppage.

Unprivileged instructions are always permitted to execute. Therefore, if no privileged instructions are permitted to execute in an application program address space in AR0, all of the privileged instruction subclass bits S1 . . . Sn are set to 1 to disable all privileged instruction execution.

The bits T1 . . . Tn in ARCV 1-15 in FIG. 4 are used as an extension of the operation code of the current instruction being interpreted in instruction decoder 9. For example, the operation code for an instruction can generically signal the multiplication of its operands. Then the bits T1 . . . Tn will indicate the data type in the address space in the corresponding AR1-15 and signal that data type on bus 49B to operation decoder 16A so that the instruction unit can perform the multiplication on the data type indicated as being accessed in the corresponding address space. Examples of the meanings of bits T1 . . . Tn are:

1. Fixed point
2. Single Precision floating point
3. Double precision floating point
4. Extended precision floating point Additional controls may be implemented in the ARCV's. Indicators may be included in the ARCV's to specify 24 or 31 bit addressing mode, whether or not an address space contains segments common to other address spaces, whether the origin of the space is zero or some other value, what ranges of logical addresses are to be allowed access and even whether the logical address is to be translated to real (DAT on) or treated as a real address (DAT off). The circuits and implementation for such additional controls are straight forward and are not shown in the drawings.

It is understood that the main storage real address resulting from a translation, including from a TLB lookup, may access the main storage data in a cache or high speed buffer (instead of in main storage) in any system having the data previously transferred from main storage to a cache or high speed buffer.

The address translation means shown in FIG. 1 using segment and page tables is only one example of an address translation means, and the invention may be used with any other address translation means, such as for example, hashing address translation means as is described in the "IBM System/38 Technical Developments" manual (Form No. G580-0237) on page 23.

Figure 5:
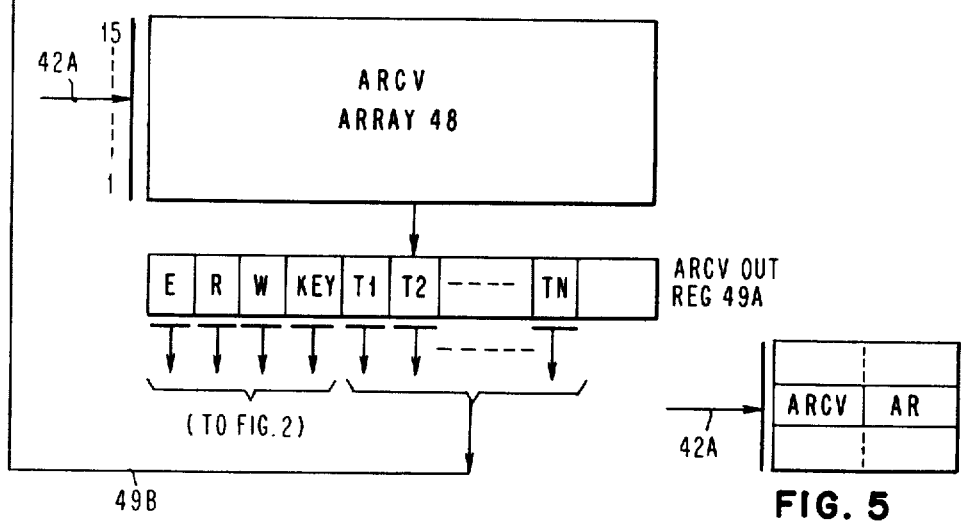
FIG. 5 is a modification to the embodiment in FIG. 2 in which a single array contains both the AR and ARCV registers.

FIG. 5 shows a modification to the embodiment in FIG. 2 in which both the AR array 46 and the ARCV array 48 are combined into a single array 46A in which each entry is associated with a respective GPR and contains both the associated AR register and ARCV registers; and logic may be used to inhibit the AR-/ARCV output when a non-address containing GPR is selected.

Although this invention has been shown and described with respect to plural embodiments thereof, it should be understood by those skilled in the art that various changes and omissions in the form and details of the invention may be made therein without departing from the spirit and scope of the invention.

Having thus described our invention, what we claim as new and desire to secure by Letters Patent is:

1. Virtual address translation control means for a logical storage operand address in a data processing system having at least one central processor (CP) with a predetermined number of general purpose registers (GPR's), some instructions of the CP specifying a GPR address as a base GPR address or as a non-base GPR address, the base GPR address locating a GPR having contents that take part in a calculation of an instruction's logical storage operand address from an instruction's operand address components including at least a base GPR and optionally including either one or both of a non-base GPR and a displacement field, the effective logical storage operand address being generated by means of the addition of the content of the base GPR and the content of any no-base GPR and any displacement field, the virtual address translation control means comprising:

means in the CP for detecting a base GPR address in an instruction, including instruction operation code decoding means for signalling whether a GPR designation in an instruction is a base GPR address or a non-base GPR address, a plurality of access registers (AR's), each AR being loadable with an address space identifier (ASI) for locating a translation table defining an address space, means for selecting an AR with the base GPR address provided by the detecting means, and the selecting means not selecting an AR with a non-base GPR address provided by the detecting means, virtual address translation means receiving the effective logical storage operand address and an ASI from the AR selected by the selecting means to locate a translation table and using the translation table to translate the effective logical storage operand address to a real address in a main storage of the data processing system, whereby plural ARs containing different ASIs enable the data processing system to concurrently access plural address spaces.

2. Address control means in a CP as defined in claim 1, in which the CP has a control register for containing a program ASI for defining the program address space of a program being executed, further comprising:

instruction fetch controls in the CP providing a logical instruction fetch address for each instruction fetch request, the address translation means connected to the instruction fetch controls and receiving the program ASI content of the control register for translating the instruction fetch address to a real address in main storage for the program being executed, whereby the control register containing the program ASI acts as a program AR, and the program being executed in a program address space can access data in any address space specified by the content of any selected AR.

3. Address control means in a CP as defined in claim 1, further comprising:

a plurality of access register control vector (ARCV) registers, each ARCV register containing control fields, the selecting means also selecting the associated ARCV register when an AR is being selected to associate an ARCV with an AR for controlling the CP operation, and means responsive to the control fields in a selected ARCV register for regulating the operation of the CP when handling data accessed from the address space specified in an associated AR.

4. Address control means in a CP as defined in claim 3, the control fields in each ARCV register further comprising:

an access mode control field for controlling the types of access permitted to the address space identified in the associated AR.

5. Address control means in a CP as defined in claim 1, further comprising:

an enable/disable field associated with each AR, transfer means between the ARs and the address translation means for transferring the content of the AR selected by the selecting means to the virtual address translation means if the enable/disable field is set to an enable state, the transferring means not transferring any content of said AR if the enable/disable field is set to a disabled state, whereby when the enable/disable field for an AR is set to the disabled state, the virtual address translation means translates an operand address using the selected base GPR in the same way as in a system in which the ARs do not exist.

6. Address control means in a CP as defined in claim 4, the access mode control field in each ARCV register further comprising:

at least a write authority protection field which can be set on or off, means for signalling storage write request signals from an instruction execution unit in the CP, program interrupt means connected to the signalling means for being actuated by the write request signal when the write authority protection field is off in the selected ARCV, whereby the operand address translation for a write request is interrupted if the selected ARCV register does not indicate the required write access authority.

7. Address control means as defined in claim 4, the access mode control field in each ARCV register further comprising:

at least a read authority field which can be set on or off, means for signalling storage read request signals from an instruction execution unit in the CP, program interrupt means connected to the signalling means for being actuated by the read request signal when the read authority protection field is off in the selected ARCV, whereby the operand address translation for a read request is interrupted if the selected ARCV register does not indicate the required read access authority.

8. Address control means for a CP as defined in claim 2, further comprising:

a program ARCV register for being selected by the instruction fetch controls with the program AR, the program ARCV register containing an access authority protection field, program interrupt means being connected to the signalling means for being actuated by an instruction access request signal to the program address space if the request does not have the authority indicated by the access authority protection field in the program ARCV register.

9. Address control means as defined in claim 1, further comprising:

a special control register for containing a main storage address and extent information for locating ASI data in a special area in main storage which are to be loaded into the AR's, the special control register being loadable only by a privileged load control instruction, a non-privileged load AR instruction for reading out the special control register for controlling the loading of the ARs, the load AR instruction specifying one or more ARs to be loaded and the main storage address of the ASI data to be loaded into the specified ARs, instruction unit means for executing the load AR instruction, main storage means for accessing the ASI data at the main storage address into a storage out register under control of the special control register, the instruction unit means loading the ASI data into the specified ARs to identify the address spaces accessible to the CP, whereby the privileged load control instruction only permits a supervisory-state program to define the main storage location and extent of ASI data, while the non-privileged load AR instruction permits a problem-state program to load the ARs with ASI values in a main storage location determined by the supervisory program.

10. Address control means in a CP as defined in claim 9, further comprising:

a plurality of access register control vector (ARCV) registers, the selecting means also selecting an associated ARCV register when selecting an AR, each ARCV register containing control fields for regulating the operation of the CP when accessing the address space specified in the associated AR, the content of the special control register defining an area in main memory having data for loading both the AR and ARCV registers, the instruction unit loading means also loading a subset of the ASI data into each ARCV register associated with an AR being loaded.

11. Address control means as defined in claim 9, further comprising:

means to test a valid field of the storage out register to determine if the ASI data is valid, and means to inhibit loading the ASI data into the specified AR if the ASI data is not valid.

12. Address control means as defined in claim 1, further comprising:

a special control register for containing a main storage address and extent information for locating a special area in main storage into which the content of an AR can be stored, the special control register being loadable only by a privileged load control instruction, a non-privileged store AR instruction for reading out the special control register for controlling the storing of the ARs, the store AR instruction specifying one or more Ars having contents to be stored in the special area in main storage determined from the address information in the special control register, instruction unit means responsive to the execution of the store AR instruction, main storage means for storing the AR contents into the special area in main storage under control of the execution of the non-privileged store AR instruction, whereby the privileged load control instruction only permits a supervisory program to define the special area in main storage, while the non-privileged store AR instruction permits a problem-state program to store the content of the ARs into a main storage location controlled by the supervisory program.

13. Address control means as defined in claim 12, further comprising:

a plurality of access register control vector (ARCV) registers, an ARCV register being selected by the selecting means along with the selected AR for regulating the operation of the CP when handling data accessed from an address space specified in the selected AR, the non-privileged store AR instruction being executed by the instruction unit means also storing data from the selected ARCV register into the special area in main storage under control of the special control register.

14. Address control means as defined in claim 1, further comprising:

instruction unit means for interpreting a disable/enable AR instruction, an enable/disable field associated with a selected AR, means responsive to the instruction unit means for setting the enable/disable field for the selected AR to an enabled or disabled state as indicated in the instruction.

15. Address control means as defined in claim 3, further comprising:

one of the AR and its selected ARCV register being predesignated as a program space AR/ARCV pair to control an address space for an executable program, and the remaining AR/ARCV pairs being available to control data address spaces.

16. Address control means as defined in claim 15, further comprising:

an enable/disable field in each ARCV register, any of the remaining AR/ARCV pairs with its enabled/disabled field set to a disabled state having its corresponding GPR associated with the program space AR/ARCV pair.

17. Address control means as defined in claim 16, further comprising:

the ARCV register in the selected AR/ARCV pair having a plurality of instruction subclass mask bits respectively associated with different subclasses of instructions, program interrupt means actuated by operational decoding of an instruction in a subclass having its mask bit disabled in the selected AR/ARCV pair, 'whereby an accessed instruction in a subclass with a disabled mask bit with activate the program interrupt means.

18. Address control means as defined in claim 3, further comprising:

each of the plurality of ARCV registers having authority control bits to enable/disable read or write requests to the corresponding address space, program interrupt means actuated by an access request when the authority control bit is disabled for the access request.

19. Address control means as defined in claim 1, further comprising:

the address translation means using each ASI as a segment table descriptor (STD) to locate a particular segment table, whereby each requested logical address is accessed into the address space defined by a STD.

20. Address control means as defined in claim 15, further comprising:

an array having each addressable location containing a respective AR/ARCV pair.

21. Address control means as defined in claim 17, instruction subclass mask bits in the program space ARCV defining different subclasses of privileged instructions.

22. Address control means for a CP as defined in claim 3, further comprising:

each ARCV register having a plurality of data type code bits settable to select any one of a plurality of types of data, operand field definition means for decoding the data type code bits in a selected ARCV register to select the data type used for operands handled in executing an instruction in the CP.

23. Address control means as defined in claim 22, the operand field definition means further comprising:

an ARCV out register for receiving the content of the selected ARCV register including the data type code bits, means for decoding the data type code bits in the ARCV out register to determine the data type for executing current instructions in the CP, the data type code bits indicating the data type for each operand to be one of: fixed point, decimal, single precision floating point, double precision floating point, or extended precision floating point, means for controlling the CP to handle all operand bit positions according to the data type determined by the decoding means.

24. Address control means for a CP as defined in claim 3, further comprising:
   each ARCV register having an address size field for indicating the number of bit positions in the address required to locate data in an address space defined in the AR in an AR/ARCV pair being selected for a GPR base register,
   decoding means receiving the bits of a selected ARCV and detecting the address size field to control the storage operand address size of each effective storage address generated from each storage operand address in a current instruction being executed for accessing the address space defined in the selected AR,
   whereby the CP can change the address size in accordance with the size of the address space being addressed, so that a single program can use plural address sizes without changing any program status word for the central processor.

25. Address control means as defined in claim 24, the address size field in each ARCV register further comprising:
   a bit position in which one state indicates a B 24 bit position address size and another state indicates a 31 bit position address size.

26. Address control means for a CP as defined in claim 3, further comprising:
   each ARCV register having a control field settable to indicate whether or not the ASI in the associated AR has segments common to other address spaces, whereby a common segment can be accessed with the use of a base GPR without regard to the ASI value in the associated AR.

27. Address control means for a CP as defined in claim 3, further comprising:
   each ARCV register having a DAT control field settable to indicate whether an effective address generated with the content of an associated base GPR is to access main storage as an address having dynamic address translation (DAT) or as an address not receiving dynamic address translation,
   address translation means in the CP being activated to translate the effective address only if the DAT control field is set to indicate DAT is on,
   whereby no DAT control is required in a program status word (PSW) for the CP.

28. Address control means for a CP as defined in claim 3, further comprising:
   each ARCV register having address range fields for indicating a range of logical addresses allowed to be accessed in the address space defined in the associated AR in an AR/ARCV pair being selected by a GPR base address,
   decoding means receiving the bits of the selected ARCV and detecting the address range fields to control the storage operand access for each effective storage address generated from each storage operand address in a current instruction being executed for accessing the address space defined in the selected AR,
   whereby addresses generated with different base GPRs can have restricted accessing to different segments in the same address space.

* * * * *